(12) United States Patent
Miller et al.

(10) Patent No.: US 7,587,523 B2
(45) Date of Patent: Sep. 8, 2009

(54) DISTRIBUTED SYSTEMS FOR DETERMINING CARD STATUS

(75) Inventors: Paul Miller, Derry, NH (US); Daniel W. English, Salem, NH (US)

(73) Assignee: Cedar Point Communications, Inc., Derry, NH (US)

( * ) Notice: Subject to any disclaimer, the term of this patent is extended or adjusted under 35 U.S.C. 154(b) by 607 days.

(21) Appl. No.: 10/727,139

(22) Filed: Dec. 2, 2003

(65) Prior Publication Data

US 2005/0028021 A1 Feb. 3, 2005

Related U.S. Application Data

(60) Provisional application No. 60/430,494, filed on Dec. 2, 2002.

(51) Int. Cl.
*G06F 3/00* (2006.01)
(52) U.S. Cl. .............................. 710/19; 710/15; 710/17; 710/107; 710/110; 714/2; 714/5; 714/10; 714/25; 714/44
(58) Field of Classification Search ........................ None
See application file for complete search history.

(56) References Cited

U.S. PATENT DOCUMENTS

| | | | | |
|---|---|---|---|---|
| 3,783,250 A | * | 1/1974 | Fletcher et al. | ................ 714/11 |
| 5,123,089 A | * | 6/1992 | Beilinski et al. | ............ 709/237 |
| 5,630,046 A | * | 5/1997 | Loise | ........................... 714/11 |
| 6,434,698 B1 | * | 8/2002 | Maiolani et al. | ................ 713/2 |
| 6,931,568 B2 | * | 8/2005 | Abbondanzio et al. | ......... 714/11 |
| 2001/0021955 A1 | * | 9/2001 | Deng | .......................... 710/101 |

* cited by examiner

*Primary Examiner*—Eron J Sorrell
(74) *Attorney, Agent, or Firm*—Ropes & Gray LLP

(57) ABSTRACT

The master/slave arbitration process includes a voting process that allows cards within the system to use voting to determine the health of each of the individual cards. The voting process thereby allows the system to determine whether a bad card is present and to make sure that a bad card has not been selected to be the master card for the system. By preventing a bad or malfunctioning card from being selected as the master, the systems and methods described herein guard against a system failure that may arise from appointing a malfunctioning card as the master card.

20 Claims, 3 Drawing Sheets

DISTRIBUTED SYSTEMS FOR DETERMINING CARD STATUS

REFERENCE TO RELATED APPLICATIONS

This application claims priority to Provisional application Ser. No. 60/430,494, filed on Dec. 2, 2002, and incorporated herein by reference in its entirety.

BACKGROUND

In a system with more than one hardware-based controller, a single controller typically acts as the master and the other controllers act as the slaves, ready to become the master if the master should fail. The master can have control over the system bus, it can control which cards are active at a time and it can control system functions, such as reset operations and shutdown. Moreover, in a redundant system, the master may be the active card, while the redundant card or cards are maintained offline. Accordingly, it is important that the master controller function properly, and if the master card were to fail, it should be quickly isolated from the system and another controller should quickly replace it as master.

It is generally a difficult problem to correctly assign master and slave or active and isolated relationships to controllers in the presence of all possible failures. Typically, software is written to implement a process that should anticipate all possible failures and devise a fail safe plan that will transition the malfunctioning card out of the system and hand over its role to a card that is operating properly. However, in practice it is difficult to anticipate all the ways a card may fail. Moreover, it is commonly the case that the process fails to consider certain hardware failures that will cause a failed controller to be given master status in the system. When this happens the successful operation of the entire system is in jeopardy.

Even if an adequate scheme can be put in place to anticipate failures, existing master/slave arbitration systems employ a centralized architecture that has a central point of control. This central point of control causes problems in that a single board or component failure can result in a system-wide failure. This is particularly troubling for mission critical systems, such as telecommunication systems and defense systems.

Accordingly, there is a need in the art for a more robust system for allowing master/slave arbitration between a plurality of cards.

SUMMARY

The systems and methods described herein include, among other things, systems and methods for arbitrating between a master and slave status or an active or protection status. More particularly, the systems and methods described herein may be employed in a system that provides for redundancy, such as hardware redundancy, although these systems and methods may be applied to other systems as well wherein there is in interest in detecting a failing circuit or device and isolating that circuit board device from the rest of the system to thereby prevent or reduce the likelihood of a larger system wide failure.

In one particular embodiment, the systems and methods described herein include a process for arbitrating between an active and protected status. Such processes may comprise the steps of identifying a plurality of cards that are capable of communicating with each other, allowing each card to determine the health of another card in the system, allowing each card to delivery to another card a vote that is representative of the respective card's determination of the health of the other card, and having a respective card determine, as a function of the delivered votes, a health status representative of whether the card is to be isolated.

In one particular embodiment the process determines the health status by reviewing delivered votes and determining as a function of the majority of votes whether the health status of the respective card should change. If it is determined that the health status should change from a healthy status to an isolated status, then the processes described herein can include mechanism for driving the respective card into an isolated state. When making the determination of the health of a card, and when voting, a card may generate its vote as a function of measuring response time of a card at issue, identifying a parity error from data received from the card at issue, identifying a check sum error in data received from the card at issue, and identifying a failure to respond to a command delivered to the card at issue.

In certain preferred embodiments, the act of isolating a card will include having the card enter a state that prevents the card from exchanging data with other cards or devices in the system. The step of isolating can include disabling a hardware interface that couples the card to an external system bus.

In a further optional embodiment, the processes can include a step of providing a self-diagnostic test that has the card monitor a local perimeter to make a local determination of health status. Optionally this local determination of health status may be employed for determining whether to enter an isolation state.

In another aspect, the invention provides apparatus for arbitrating between an active and protected status. The apparatus can comprise a plurality of cards that are capable of communicating with each other, a data processor for each card that allows that card to make a determination of the health of at least one other card in the system, a voting circuit that allows each card to deliver to another card in the system a vote signal that is representative of the respective cards determination of the health of at least one other card, and a vote tallying state machine capable of having a respective card determine, as a function of delivered votes, a health status representative of whether the respective card is to be isolated.

The systems and methods described herein may be applied to switching systems, computer networks, and other devices and for the purpose of illustration certain illustrated embodiments will be depicted and described. However, the invention is not to be so limited and those of ordinary skill in the art will understand that certain modifications and additions may be made to the systems described herein without departing from the scope of the invention.

BRIEF DESCRIPTION OF THE DRAWINGS

The present disclosure may be better understood and its numerous features and advantages made apparent to those skilled in the art by referencing the accompanying drawings.

The use of the same reference symbols in different drawings indicates similar or identical items.

DETAILED DESCRIPTION OF CERTAIN ILLUSTRATED EMBODIMENTS

Figure 1:
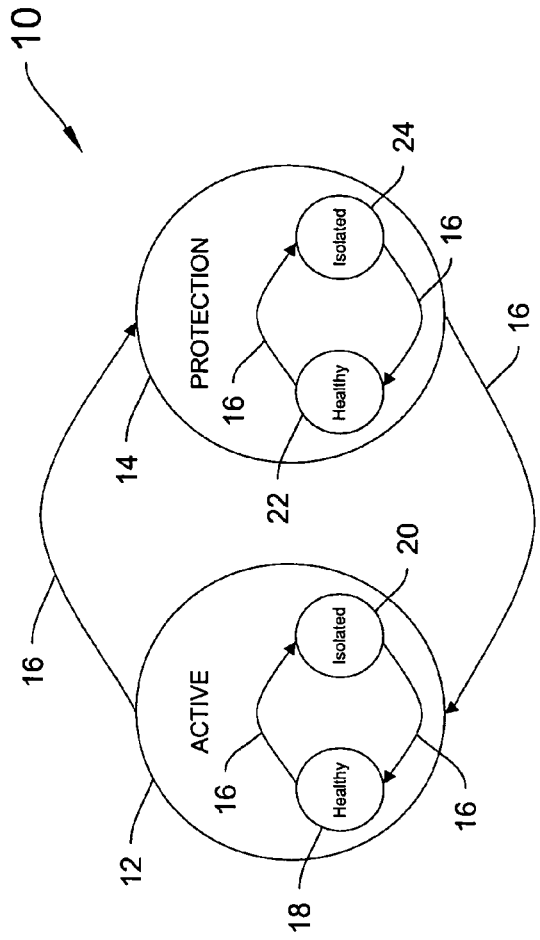
FIG. 1 depicts a state diagram representation of operating modes employed by the invention.

Below are presented several systems and processes that provide improved equipment for delivering voice services over a cable network. As will be described below, these systems and processes provide redundant components that can be brought on line as needed to isolate a failed component from the system. To this end, the systems may employ a voting process that allows the cards in a system to vote on the health or operating condition of other cards in the system.

In a system with more than one hardware-based controller, a single controller typically acts as the master and the other controllers act as the slaves, ready to become the master if the master should fail. It is generally a difficult problem to correctly assign master and slave relationships to the controllers in the presence of all possible failures. Typically, software is written to implement a process that fails to consider certain hardware failures that will cause a failed controller to be given master status in the system. The systems and methods described herein provide a mechanism integrated with both hardware and software that makes a comprehensive or substantially comprehensive determination of who should be the master controller. In addition, the systems and methods described herein provide a mechanism for effectively isolating the failed controller from the system so that it can not harm the system. Moreover, in the systems and methods described herein, the master/slave arbitration system employs a distributed architecture that distributes control of the arbitration system and process across a plurality of devices. In this way the system is more resistant to error arising from a single point of failure.

The systems and methods include an arbitration process that allows for isolating the failed card. As will be seen from the following description, the arbitration process employs a software arbitration process to arbitrate between a plurality of cards to identify or select one of the cards to be the master. Any suitable master/slave arbitration process may be employed for initially selecting master/slave status for the plurality of cards and suitable arbitration processes are known to those of skill in the art. For example, upon system initiation a master card may be selected by default, such as by function of card slot. Once selected, the master card is typically activated or brought on line to function within the system. Any card or cards that provide redundancy support will typically, upon power-up, be isolated from the system. Again, the initial arbitration or selection of which the available cards are to be brought on-line may be accomplished by any suitable technique, including by back plane wiring of the card slot.

The arbitration process includes a voting process that allows cards within the system to cast votes to determine the health of each of the individual cards. The voting process thereby allows the system to determine whether a bad card is present and to make sure that a bad card has not been selected to be the master card for the system. By preventing a bad or malfunctioning card from being selected as the master, the systems and methods described herein guard against a system failure that may arise from appointing a malfunctioning card as the master card. Optionally and preferably, the systems described herein will also isolate a malfunctioning card from the system. Further optionally, the systems may select a new card as active or master as a result of isolating a failing active card.

FIG. 1 depicts diagrammatically the master/slave (or active/protected) and healthy/isolated states employed by one embodiment of the system. In particular, FIG. 1 depicts diagramatically a state diagram 10 that includes an active state 12 and a protection state 14. In the active state 12, a card would be active and exchanging information across the back- or mid-plane with other cards in the system. In the protection state 14, as will be described in greater detail hereinafter, the card would be decoupled or otherwise logically and/or physically separated from the mid-plane, back-plane or other cards in this system. As further shown in FIG. 1, the card can move back and forth from the active state 12 to the protection state 14 as shown by the state diagram transfer lines 16. Similarly, within the active state 16, the card can alternate between a healthy state 18 and an isolated state 20. Similarly, in protection state 14, the card can move between a healthy state 22 and an isolated state 24. Thus, FIG. 1 depicts a set of states that a card may be in.

The state diagram 10 depicted in FIG. 1 can be coded into a state machine of the kind commonly employed in digital logic design. The design and development of such state machines is known to those of skill in the art and is discussed in David J. Cromer, Digital Logic and State Machine Design, CBS College Publishing, New York (1995). In a typical implementation, the state machine is built using a programmable logic device that has input and output pins that can receive and transmit signals to drive the state machine from one state to another and to generate the appropriate responses as it moves from state to state. Any suitable programmable device may be used, including commercially available devices from ATMEL Corporation of San Jose, Calif., including the ATMEL 6000 FPGA FIG. 1 shows that in response to a particular state, the actions and operations of the card may be modified in a way that reduces the likelihood of overall system failure. This is true whether the card is in active state 12 or protection state 14. As described herein, a software master/slave arbitration process may be employed for performing active/protection arbitration regardless of state, as even a card in protection state can cause system damage if it is failing. In one process, to distinguish between healthy cards and cards that are to be isolated, the systems and methods employ a health voting process that requires a majority (i.e., two of three) of cards to vote that a particular card is healthy.

This process handles system level redundancy between different cards in any type of system. For purposes of illustration the systems and processes are described with reference to a switch system that supports the switching of data being transferred across a network including a cable network. In this example, the system and methods will be discussed with respect to a switch system that has system control processor (SCP) cards and routing switch fabric (RSF) cards, including redundant pairs with stable common system control handling for alarms, reset, power control, communications, etc. As described herein, certain embodiments include hardware support for processor isolation, as well as isolation mechanisms for common system controls and insertion scenarios. Hardware support may also be provided for system power-up sequencing. The hardware portion of the redundancy circuit may contain signals which are distributed on a midplane to assist in health determinism, as well as indicators for slot position and Active/Protection status. The redundancy circuitry may be identical on each card. In one embodiment the software process implements an Active/Protection arbitration process after system start. Hardware, in this embodiment, is responsible for protection (via isolation) of the system.

Figure 2:
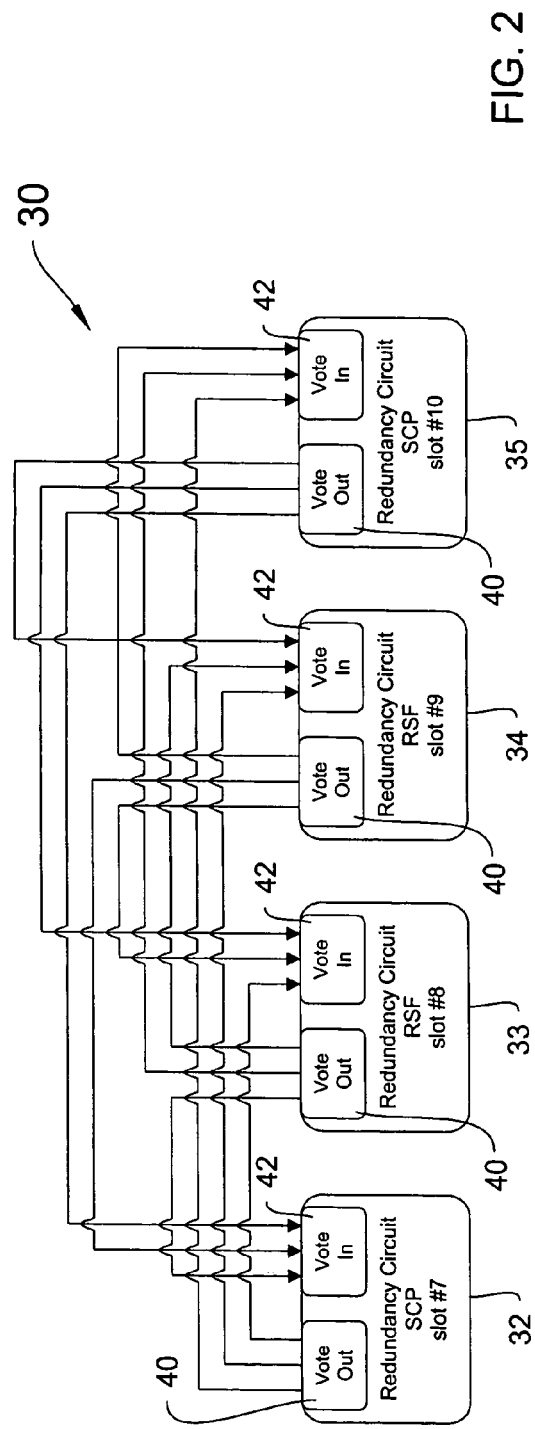
FIG. 2 depicts a functional block diagram showing communication paths between cards in a system.

In this embodiment, hardware-level health voting is employed to determine health/isolate status. FIG. 2 depicts four cards, or at least the redundancy circuits on four cards, connected together, including two SCP cards (SCP 7 and SCP 10) and two RSF cards (RSF 8 and RSF 9). More particularly, FIG. 2 depicts a system that comprises four circuit cards shown in FIG. 2 as an SCP card 32 placed in slot number 7, RSF card 33 placed in slot number 8, RSF card 34 placed in slot number 9 and SCP card 38 placed in slot number 10. As further depicted in FIG. 2, each of the circuit cards 32 through 38 includes a vote-out logic circuit 40 and a vote-in logic circuit 42. The system 30 includes two SCP cards and two RSF cards and one of each pair of cards can be in the active state 12 and one in the protection state 14.

Each depicted card 32-38 has a six-pin interface (on all four cards). Three pins are connected to circuit block 40 titled "Vote Out" and three pins are connected to a circuit block 42 labeled 'Vote In'. As shown, each of the three pins on the Vote Out block is connected to one Vote In pin of a respective one of the three other cards in the system 30. Thus, the voting circuitry of each card is connected to the voting circuitry of each other card in the depicted system 30. In this embodiment and for this purpose, all four cards behave identically, and have the same state machines and hardware. The hardware and state machines support the Voting process.

Although FIG. 2 depicts a system 30 having 2 pairs of cards, where one card in the pair is active and another card in the pair is protected, the systems are not so limited. For example each card type may have multiple redundant cards or devices, and can select among the available redundant cards or devices as needed to replace a failing active or protected card. Additionally, the system 30 employs hardware redundancy for each card type. This is not necessary, and in certain applications only some card types are part of the arbitration system. In still other embodiments, certain ones or all of the cards may be supported by software redundancy systems that activate software modules to simulate the functioning of one of the cards. Thus, in these embodiments, the software modules can exchange vote signals with the circuits and with other software modules. Moreover, in certain alternate embodiments the system may comprise a network of computers/servers having redundant components, and the arbitration system can bring systems online and offline as appropriate. Other systems and applications of the invention will be apparent to those of skill in the art.

In the embodiment of FIG. 2, each card 32-38 can give and receive votes to and from the other three cards in the system 30. In the embodiments described herein, no single card can change the status of another card, however a two out of three vote is required to keep the card in a "healthy' state. Thus, if the software on a card suspects that another card in the system 30 is faulty, that card can vote on the health of the suspect card. If another card in the system 30 also suspects that the same card is faulty, it too can vote on the health of the suspect card. In this case, where two of the three cards vote that the card is faulty, the state machine of the suspect card can identify that its health is suspect and move to put itself in an isolation state where it cannot harm the rest of the system 30. A card can suspect another card of being faulty if it appears to the first card that the other card is not responding, is responding too slowly, delivers data with parity or checksum errors, or for other similar reasons. In the embodiment of FIG. 2, the Voting system includes four cards and all three votes are considered. However, in other embodiments, where the number of cards may be larger or smaller, the percentage or the number of cards that need to vote a certain way to change the status of a card can vary. For example, in some cases all cards must vote the same way to change the health status of a card. In other embodiments, the system provides a weighting function that weighs the votes of some cards more heavily than others, or that allows one card to dictate status regardless of the votes received from other cards. In other embodiments, only certain cards connect to other cards. Still other embodiments and practices may be employed as the application requires.

In one embodiment, the override is implemented as part of the redundancy circuit. To this end, the override may part of the logical state machine implemented as part of a CPLD/FPGA device. The unlock sequence may be a set of predetermined logical operations, such as unique memory access, mathematical operations using operands stored in preselected memory locations, and other such functions, that move a sequence lock through a series of steps. By following these steps, the programmable logic device will move through a series of states that result in granting the override software access to the control register that sets the state of the vote out signal or signals. An example of one such lock is described with reference to FIG. 4.

Vote Out Functions

The circuit in block 40, in one embodiment, includes, a firewall unlock sequence register to allow local software override and control of voting status for any of the 'vote out' signals. This provides a mechanism for higher-layer software redundancy protocols to vote in the hardware isolation mechanism. (i.e., if local software on SCP #7 believes SCP #10 is bad, it may vote to cause isolation by accessing the vote control register). A failure of the hardware watchdog, local protocol violation, or assertion of reset will drive all 'vote out' signals to the healthy state (a defective card should not affect ⅔ voting. Its vote is invalid when unstable). This also applies when a card is voted into isolation, its own vote outputs will go "healthy".

Vote In Functions

In one practice, voting is by 2 out of 3 system cards. There is no vote from the local card, external inputs are the only votes present. No single card may take out another, and at least two of three must concur on the fourth's condition. A card may not vote on its own health, other than negatively (failure due to heartbeat timeout, etc). Optionally, a system card may isolate itself through other means. The Vote In function is implemented as a state machine that responds to input signals, including the Vote input signals from the other cards. In one embodiment, the state machine is implemented in a programmable logic device, although other designs, including microcontroller based designs, may also be employed.

As described above, a vote is accepted from each of the three other cards present in the system 30. Vote inputs 42 to the redundancy circuits are pulled to the healthy state at the input to the card receiving the vote. This along with optional debounce protects the cards against live card removal interfering with the voting. Votes may be debounced over a reasonable time period, using a local free-run timing oscillator. In a non-redundant configuration, or a configuration where a card is removed, the vote may be pulled to the healthy state, this is accomplished by pull-up resistors, typically on the plane or termination card. This ensures effective de-activation of the voting portion of the redundancy circuit with this system configuration. Note that in a system configuration with two RSFs and a single SCP (redundant switch fabrics, but non-redundant controllers), it is possible for both RSF's to vote the primary SCP to isolation. In other embodiments, the state machine in the SCP card, or any of the cards, may prevent itself from being isolated, if it is the only card performing a certain function. However, in a preferred embodiment, any card can be voted out if it appears to be malfunctioning to a significant number of cards in the system, or to other higher level processes. In a case where the only remaining SCP card is voted out, a termination card, or pull-ups on the card should place the card in an isolated state that does not harm the overall system 30.

Although the system and process discussed above with reference to the Figures describes a system that provides each card with on board logic to vote on the health of other cards in the system and to respond to the votes of other cards, it will be apparent to those of skill in the art the systems and processed are not so limited. For example, in other embodiments, the systems may provide a back-plane or mid-plane that includes some or all of the voting logic. Moreover, although the described systems provide a preferred approach that distributes the arbitration process, it can be, in other embodiments, that the systems employ a central logic device that performs the voting arbitration process described above.

Along with the health voting process, other events may be monitored by the system cards 32-38, typically in hardware, to determine when a card should be isolated. One example presented below is a heartbeat monitor. However this is not the only event that may be of interest and other events may also be monitored and employed to decide the proper state of the system card.

Heartbeat

In one embodiment a retriggerable monostable timer runs in hardware and is to be accessed by software periodically to ensure the redundancy circuit does not isolate the card. This is a mechanism used to determine the health of the local processor/software. Reset or power cycling will restart the timer. Rather than have a power-on fixed delay to wait for software start, the timer's start may be initiated by the first heartbeat access by software. Control register access may be denied until the start of the hardware watchdog timer. In the event that software does not initialize to the point of being able to participate, the card may be voted at any time into isolation by the above described ⅔ voting mechanism. Otherwise, the redundancy circuit will idle waiting for the first heartbeat. The first access the software makes to the redundancy circuit will be to the hardware watchdog. Note that the card may not be isolated upon power-up, cold start, or reset. This allows it to participate in power sequencing, etc. However, control register access may be denied as indicated above until: the Heartbeats start, and all registers are initialized.

Figure 3:
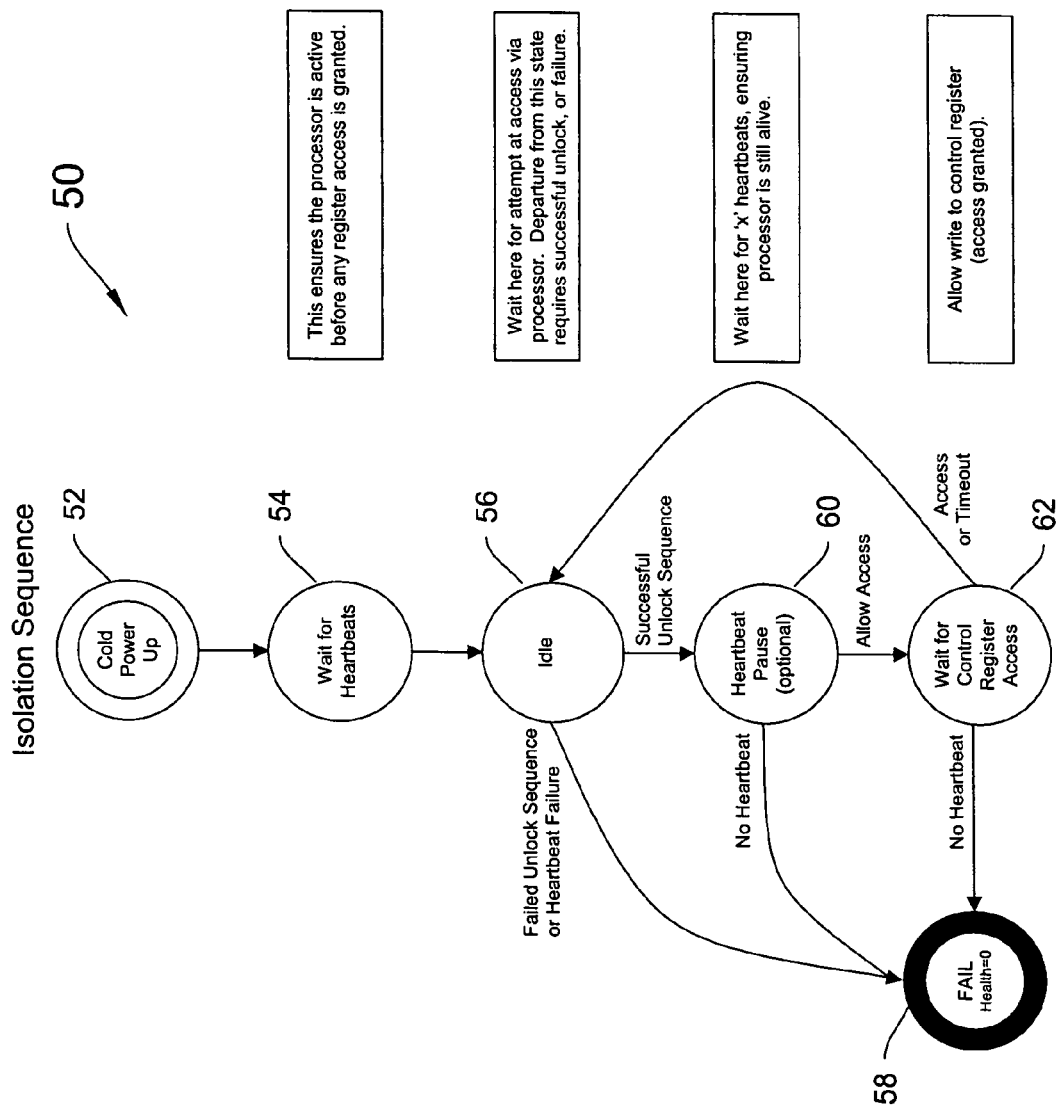
FIG. 3 depicts a flow chart representation of one process for isolating a card.

FIG. 3 depicts one example of an isolation sequence that may ensure that a processor is active before granting any register access. More particularly, FIG. 3 depicts a process 50 for isolating a card from the system 30. As shown in FIG. 3, the process begins in a step 52 wherein the card powers up from a cold start. Once powered up the process proceeds to step 54 wherein an onboard software process waits to detect a heartbeat generated, typically, by the local oscilator or circuit connected to the local oscillator. The heartbeat detect step 54 waits for a heartbeat to ensure that the processor is up and active before any register access is granted. After step 54 the process 50 proceeds to step 56 which is an idle mode. In the idle mode of step 56 the processor waits for an attempt at access via the processor. Departure from step 56 requires a successful unlock sequence be carried out. If there is a successful unlock operation, then the process 50 proceeds from step 56 to step 60.

At step 60, the process 50 waits to determine whether or not there is a heartbeat. This optional step 60 ensures that the processor is still alive. Once the heartbeat is detected the process proceeds to step 62 where it waits for the control register access to occur. In this step the process 50 will allow a write to the control register. Thus in step 62 the process 50 grants access to the control register. After step 62 if the access has occurred or there has been a timeout the process can proceed back to step 56 wherein process 50 will idle until driven from that state.

In the alternative, at step 62 if a heartbeat failure is detected the process proceeds to step 58 wherein the system is deemed to have failed and the health status is set to Null indicating that the card is not healthy. It will be noted that state 58 indicating the card has failed is accessible from states 56 and 60 either because a heartbeat failure occurs or because the system 30 was unable to perform an unlock sequence on the control register. Thus, as shown, for any access to be successful, the following state process is to occur: the card is to present an active software heartbeat to the watchdog, and it is to pass an unlock sequence each time it desires access to a system control function. This mechanism reduces the timeframe in which the processor has access to the system control functions. Without the unlock mechanism, the processor could access the control functions at any time. With the unlock mechanism, the system 30 is only vulnerable to processor failure between the unlock request, and the actual register access. This substantially reduces the probability of failure (a double or greater fault is now required). The isolation level increases to complete isolation in the event of heartbeat or protocol failure, as the circuitry enacts full and immediate protection. These system functions do not require high-speed access, so the insertion of unlock time is not an issue.

During the intervening period of time post failure, but pre-isolation, the system 30 is vulnerable to misbehavior by the defective card. Isolation may be bounded by hardware detection (i.e., watchdog timer, etc) and/or software detection (voting input from other cards). During the time before isolation is enacted by the control response from the first mechanism that detects failure, the common system control functions are at risk. The unlock firewall protocol protects the memory locations during this time. Thus, a firewall unlock process may also be employed to protect against memory failures. One such process is depicted in FIG. 4.

Thus for example, in a system that requires a number of cards to vote on the health of a particular card before that card is deemed unhealthy, the meaningful period of time may pass before a faulty card is detected and taken out of commission. To card against the failures that may occur during this time period, the system 30 may include a firewall with an unlock procedure or protocol that mitigates the likelihood that the failing card will effect the system 30 during this intervening period.

Figure 4:
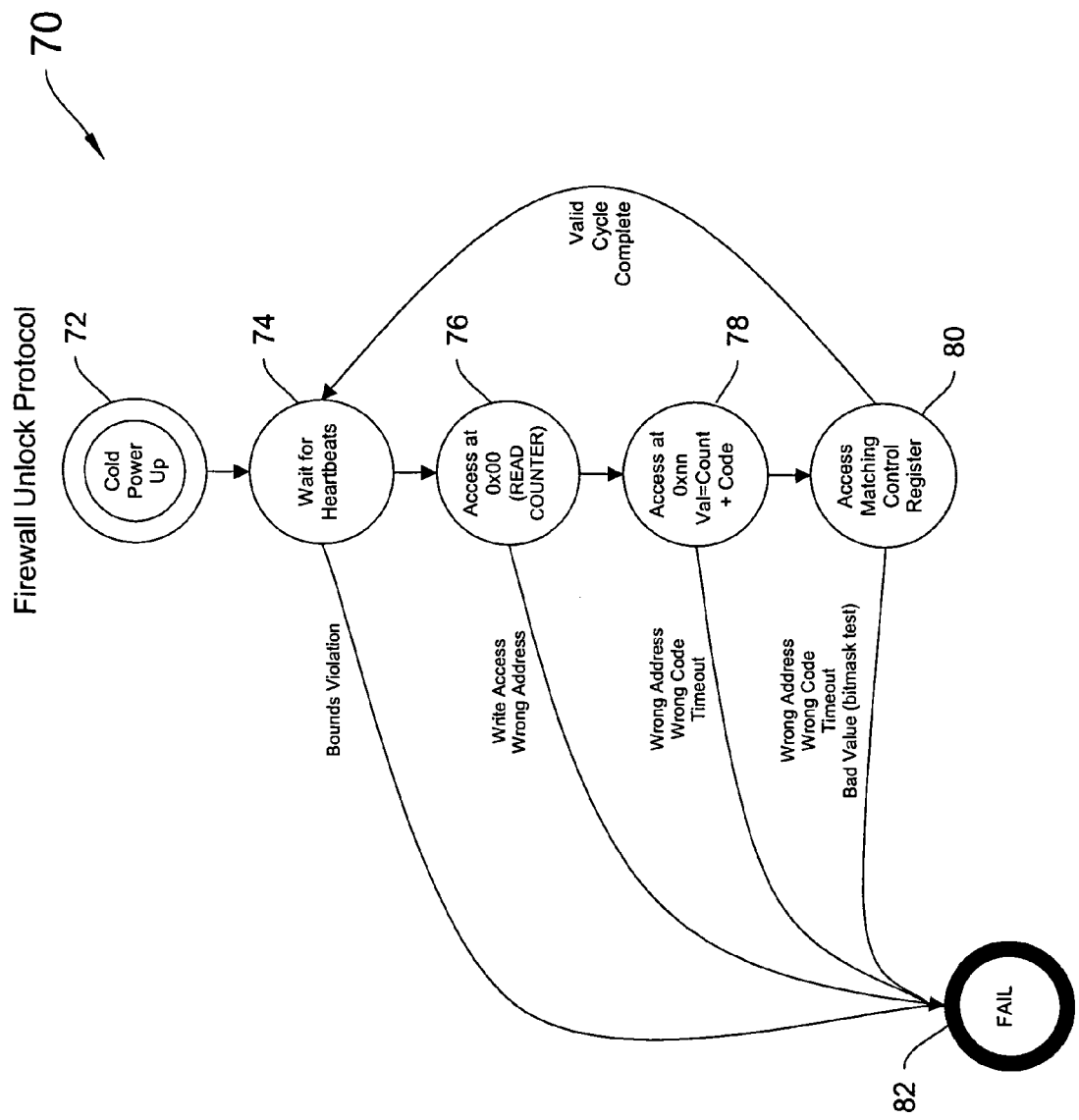
FIG. 4 depicts a flow chart diagram of a firewall unlock process.

Turning to FIG. 4 one process 70 for unlocking a firewall is depicted. As shown therein, the process 70 may begin in a step 72 wherein the card powers up from a cold start. After step 72 the process may proceed to step 74 wherein the process waits to detect the heartbeat of the card. If a heartbeat is detected then the system may proceed to step 76 wherein access at a particular location, typically a unique address, is made. In step 76 a counter is read and that information is employed in step 78 to access a code and count. If that access is accessible and the address was correct then the process proceeds to step 80 wherein an access can be made to a matching control register. If this access is successful then the process may return to step 74 wherein it waits for a heartbeat to be detected. As shown in FIG. 4, if at any point during the process 70 a step fails to complete successfully, such as because there is a boundary violation, or a write access has occurred to a wrong address or that a wrong code timeout has been determined or a bad value has been read, the system can proceed to step 82 wherein the unlock process fails. Optionally, the failure of the unlock process can lead to an indication that the health of the card is questionable or has failed. This information can be used internally for allowing the local card to arbitrate its own health status.

In certain embodiments, there are six known events that drive card isolation. The card's access to the common system function nets will be isolated when: The card's own redundancy circuit detects a heartbeat timeout, and therefore isolates the card; the voting inputs of the other cards are not sufficient to keep the card active in the system; the software, through proper access to the firewall unlock protocol, voluntarily disables the card; an unlock sequence failure occurs; a parity error occurs; and reset is asserted to the card.

The system and methods described above can be realized as hardware and software components. The software can be implemented as a C language computer program, or a computer program written in any high level language including C++, Fortran, Java or Basic. The techniques for the development of such programs are known to those of skill in the art, and set forth in, for example, Stephen G. Kochan, *Programming in C*, Hayden Publishing (1983).

Those skilled in the art will know or be able to ascertain using no more than routine experimentation, many equivalents to the embodiments and practices described herein. For example, the systems and methods have been described above with reference to embodiments where the health status of hardware devices is determined. To this end, systems comprising a plurality of circuit cards have been depicted. However, in alternative embodiments, the systems described herein could be applied to determine status of software modules, servers, blades, programmable logic elements or other devices or components. Thus the systems can be applied to components on a circuit card, nodes in a network, or any other system that employs redundant devices and/or master/share devices. Accordingly, it will be understood that the invention is not to be limited to the embodiments disclosed herein, but is to be understood to be interpreted as broadly as allowed under the law.

We claim:

1. A process for arbitrating between active and protected status, comprising the steps of
    identifying a plurality of cards capable of communicating with each other,
    allowing each card of the plurality of cards to make a determination of the health of another one of the cards of the plurality of cards,
    allowing each card of the plurality of cards to deliver to a different card of the plurality of cards a vote representative of each card's determination of the health of the different card,
    having a respective card of the plurality of cards determine as a function of delivered votes a health status representative of whether the respective card itself is to be isolated, and
    isolating the respective card as a function of delivered votes, wherein isolating a card includes entering a state that prevents the card from exchanging data.

2. A process according to claim 1, wherein determining as a function of delivered votes includes determining as a function of a majority of votes.

3. A process according to claim 1, wherein determining as a function of delivered votes includes determining as a function of a plurality of votes.

4. A process according to claim 1, wherein making a determination of the health of a card includes measuring response time, identifying a parity error, identifying a check sum error, and identifying a failure to respond to a command.

5. A processing according to claim 1, wherein isolating a card includes disabling a hardware interface to an external system bus.

6. A process according to claim 5, further comprising determining an isolation state in response to the self-diagnostic test.

7. A process according to claim 5, wherein the self-diagnostic test includes monitoring a heartbeat timer.

8. A processing according to claim 1, further comprising a self-diagnostic test for having a card monitor local parameters to determine a health status for the respective card.

9. A process according to claim 1, further comprising the step of monitoring a control signal representative of an instruction to adjust between a protection state and an active state.

10. A process according to claim 1, wherein isolating the respective card includes disabling an interface that allows the isolated respective card to deliver the vote representative of the isolated respective card's determination of the health of another one of the cards.

11. A process according to claim 1, comprising
    adding a card to the plurality of cards, and
    preventing the addition of the card from interfering with the steps of identifying the plurality of cards, allowing each card to make the determination, allowing each card to deliver, and having the respective card determine a health status.

12. A process according to claim 1, comprising
    removing a card from the plurality of cards, and
    preventing the removal of the card from interfering with the steps of identifying the plurality of cards, allowing each card to make the determination, allowing each card to deliver, and having the respective card determine a health status.

13. A system for arbitrating between an active state and a protected state, comprising
    a plurality of devices capable of exchanging data, each card of the plurality of cards having
        a card monitor for monitoring parameters of other cards in the system representative of operating characteristics,
        a vote out mechanism, responsive to the monitored parameters, for generating a vote signal representative of an assessment of each card's operating condition, and
        a vote tally mechanism, responsive to vote signals received from other cards in the system, and capable of changing an operational state of a respective card in response thereto, and
        an isolation processor for isolating the respective card as a function of delivered votes, wherein isolating the respective card includes preventing the card from exchanging data.

14. A system according to claim 13, wherein the vote tally mechanism includes a processor for detecting a majority vote with vote signals received.

15. A system according to claim 13, wherein the card monitor includes means for measuring a response time of a card.

16. A system according to claim 13, wherein the card monitor includes means for detecting an error in a data signal received from a card.

17. A system according to claim 13, further comprising a lock circuit for requiring a processor to perform a series of predetermined operations to gain access to a memory location.

18. A system according to claim 13, further comprising a self-diagnostic process for testing local parameters representative of local status of the respective card.

19. A system according to claim 18, wherein the self-diagnostic process includes means for altering a state of the respective card.

20. A system according to claim 18, wherein the self-diagnostic process includes means for driving the respective card into an isolation state.

* * * * *